United States Patent
Falls (10) Patent No.: US 9,787,747 B2
(45) Date of Patent: *Oct. 10, 2017

(54) OPTIMIZING VIDEO CLARITY

(71) Applicant: MobiTV, Inc., Emeryville, CA (US)

(72) Inventor: Ardavon Falls, Oakland, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,019

(22) Filed: Jun. 7, 2016

(65) Prior Publication Data

US 2016/0294911 A1    Oct. 6, 2016

Related U.S. Application Data (63) Continuation of application No. 13/558,545, filed on Jul. 26, 2012, now Pat. No. 9,386,331.

(51) Int. Cl.
*G06F 15/16* (2006.01)
*H04L 29/06* (2006.01)
(Continued)

(52) U.S. Cl.
CPC ........ *H04L 65/607* (2013.01); *H04L 65/4084* (2013.01); *H04L 65/602* (2013.01);
(Continued)

(58) Field of Classification Search
CPC .................. H04N 21/2662; H04L 65/4084
(Continued)

(56) References Cited

U.S. PATENT DOCUMENTS

| | | | |
|---|---|---|---|
| 7,289,506 B1 * | 10/2007 | Hannuksela ... | H04N 21/234327 370/394 |
| 7,555,006 B2 * | 6/2009 | Wolfe ............ | H04N 21/234309 370/268 |

(Continued)

FOREIGN PATENT DOCUMENTS

| | | | | |
|---|---|---|---|---|
| WO | 2011104574 A1 | | 9/2011 | |
| WO | WO 2011104574 A1 * | | 9/2011 | ....... H04N 21/23109 |

OTHER PUBLICATIONS

"[MS-RTSP]: Real-Time Streaming Protocol (RTSP) Windows Media Extensions", Microsoft Corporation, Jul. 5, 2012 00:00:00.0.
(Continued)

*Primary Examiner* — Hieu Hoang
(74) *Attorney, Agent, or Firm* — Kwan & Olynick LLP (57) ABSTRACT

Described herein are techniques and mechanisms for optimizing video clarity. According to various embodiments, a plurality of requests from client devices to access a media content item for playback at the client devices may be received at a server. Each of the client devices may have associated therewith device characteristic information that describes one or more characteristics of the client device. A device characteristic that describes a portion of the client devices may be identified. The portion of the client devices may meet a threshold value for creating a media content encoding item. A media content source item corresponding to the requested media content item may be transcoded to create a media content encoding item. The media content encoding item may be encoded to match the identified device characteristic.

17 Claims, 9 Drawing Sheets

(51) Int. Cl.
*H04N 21/2662* (2011.01)
*H04N 21/2343* (2011.01)
*H04N 21/258* (2011.01)
*H04L 29/08* (2006.01)

(52) U.S. Cl.
CPC .......... *H04L 67/02* (2013.01); *H04L 67/2809* (2013.01); *H04N 21/234309* (2013.01); *H04N 21/234363* (2013.01); *H04N 21/25825* (2013.01); *H04N 21/2662* (2013.01)

(58) Field of Classification Search
USPC .................................................. 709/228, 231
See application file for complete search history.

(56) References Cited

U.S. PATENT DOCUMENTS

| | | | | |
|---|---|---|---|---|
| 8,397,265 | B2* | 3/2013 | Henocq | H04N 21/2662 348/576 |
| 9,386,331 | B2 | 7/2016 | Falls | |
| 9,510,033 | B1* | 11/2016 | Corley | H04N 21/258 |
| 9,525,712 | B1* | 12/2016 | Batra | H04L 65/604 |
| 2003/0140121 | A1* | 7/2003 | Adams | G06F 17/30902 709/219 |
| 2003/0140159 | A1* | 7/2003 | Campbell | H04L 29/06 709/231 |
| 2007/0156924 | A1* | 7/2007 | Ramalingam | H04L 12/1822 709/246 |
| 2009/0019174 | A1* | 1/2009 | Ehn | H04L 65/4084 709/231 |
| 2010/0146139 | A1* | 6/2010 | Brockmann | H04N 21/234318 709/231 |
| 2012/0163203 | A1* | 6/2012 | Wilkinson | H04L 41/5025 370/252 |
| 2012/0170906 | A1* | 7/2012 | Soroushian | G11B 27/005 386/241 |
| 2012/0188882 | A1 | 7/2012 | Wilkinson et al. | |
| 2012/0198506 | A1* | 8/2012 | Joe | H04N 21/44209 725/97 |
| 2012/0324085 | A1* | 12/2012 | Woerndle | H04N 21/23109 709/223 |
| 2013/0042275 | A1* | 2/2013 | Payette | H04N 21/2408 725/62 |
| 2013/0091249 | A1* | 4/2013 | McHugh | H04N 21/23439 709/219 |
| 2013/0246564 | A1* | 9/2013 | Lee | H04L 67/2842 709/217 |
| 2014/0032658 | A1 | 1/2014 | Falls | |

OTHER PUBLICATIONS

"U.S. Appl. No. 13/558,545, Final Office Action date Aug. 4, 2015", 10 pgs.

"U.S. Appl. No. 13/558,545, Non Final Office Action dated Mar. 18, 2015", 10 pgs.

"U.S. Appl. No. 13/558,545, Notice of Allowance dated Mar. 11, 2016", 8 pgs.

"ATSC Digital Television Standard: Part 4—MPEG-2 Video System Characteristics", Advanced Television Systems Committee, Inc., [Online]. Retrieved from the Internet: <http://www.atsc.org/cms/standards/a53/a_53-Part-Apr. 2009.pdf>, Aug. 7, 2009 00:00:00.0.

"MPEG-4—The Media Standard", [Online]. Retrieved from the Internet: <http://www.m4if.org/public/documents/vault/m4-out-20027.pdf>, Nov. 19, 2002 00:00:00.0.

Pantos, R, "HTTP Live Streaming: draft-pantos-http-live-streaming-08", [Online]. Retrieved from the Internet: <http://tools.ietf.org/pdf/draft-pantos-http-live-streaming-08.pdf>, Accessed on Jul. 17, 2012, Mar. 1, 2012 00:00:00.0.

Schulzrinne, H, "Real Time Streaming Protocol (RTSP)", The Internet Society, [Online]. Retrieved from the Internet: <http://tools.ietf.org/pdf/draft-ietf-mmusic-rfc2326bis-29.pdf>, Accessed on Jul. 17, 2012, Feb. 1, 1998 00:00:00.0.

Schulzrinne, H. , "RTP: A Transport Protocol for Real-Time Applications", The Internet Society, Jun. 25, 1905 00:00:00.0.

Siglin, Timothy, "Unifying Global Video Strategies: MP4 File Fragmentation for Broadcast, Mobile and Web Delivery", White Paper, Transitions in Technology, [Online]. Retrieved from the internet: <http://184.168.176.117/reports-public/Adobe/20111116-fMP4-Adobe-Microsoft.pdf>, Nov. 16, 2011 00:00:00.0.

Sullivan, Gary J., "The H.264/AVC Advanced Video Coding Standard: Overview and Introduction to the Fidelity Range Extensions",. SPIE Conference on Applications of Digital Image Processing XXVII, Special Session on Advances in the New Emerging Standard, [Online]. Retrieved from the Internet: <http://www.fastvdo.com/spie04/spie04-h264OverviewPaper.pdf>, Aug. 1, 2004 00:00:00.0.

* cited by examiner

OPTIMIZING VIDEO CLARITY

CROSS-REFERENCE TO RELATED APPLICATIONS

This application is a continuation of and claims priority to U.S. patent application Ser. No. 13/558,545, filed Jul. 26, 2012 by Ardavon Falls, titled "Optimizing Video Clarity", which is incorporated by reference herein in their entirety and for all purposes.

TECHNICAL FIELD

The present disclosure relates to the encoding of video content for presentation on content playback devices.

DESCRIPTION OF RELATED ART

Content such as television programming and movies may be provided to users via various types of services such as television networks and on-demand content providers. Content transmitted to client devices for playback may be encoded using various types of encoding options. For instance, some content may be encoded at a relatively high resolution, while other content is encoded at a lower resolution. Some types of encoding, such as higher resolution encoding, may require more bandwidth for transmission. However, an encoding may offer a relatively worse viewing experience if, for example, the encoding does not match the capabilities of the device at which the content is presented. For instance, content may be encoded at a video source frame size that fails to match the device screen size, which may result in a presentation of video with a "fuzzy" appearance on the device.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Content sent from a service provider to client machines may be transcoded into various encoding formats. Transcoding may be performed to ensure that the content is encoded in a format appropriate for presentation on a client machine. A media system configured to communicate with client machines may collect information regarding the capabilities and characteristics of devices requesting a media content item. Based on this information, the media system may dynamically select options for transcoding media content items. For instance, the media system may generate encodings to match the most common screen resolutions of devices requesting a media content item.

EXAMPLE EMBODIMENTS

According to various embodiments, users may receive content from a content management service. The content management service may facilitate the interaction of users with various types of content services. For instance, the content management service may provide a user interface for managing and accessing content from a number of different content sources. The interface may display content received via a cable or satellite television connection, one or more on-demand-video service providers such as Netflix or Amazon, and content accessible on local or network storage locations. In addition, the interface may be used to access this content on any number of content playback devices.

According to various embodiments, the content management service may receive content from various sources, such as content service providers. Then, the content management service may transcode the content for transmission to client machines. Content transcoding refers to any process for changing data encoded in one format to data encoded in a different format. In particular embodiments, transcoding may involve a lossy process that introduces generation loss into the resulting content encoding. Alternately, or additionally, transcoding may involve a lossless process such as lossless compression or decompression.

According to various embodiments, content sent from a service provider to client machines may be transcoded into various encoding formats for a variety of reasons. For instance, the content may be transcoded so that content may be transmitted to client devices that do not support the original format or that have a relatively limited storage capacity that can better handle a reduced file size. For instance, Cineon and DPX files have been widely used as a common format for digital cinema, but the data size of a two-hour movie is about 8 terabytes, which is much too large for streaming over currently available networks to modern content playback devices.

In particular embodiments, techniques and mechanisms described herein may be used for HTTP streaming and/or FMP4 streaming technologies. However, the techniques and mechanisms are generally applicable to a wide range of video content technologies.

According to various embodiments, content may be received from a content source in an encoding at a relatively high resolution, such as 1900×1080 pixels. However, many content playback devices may only support much smaller resolutions. In such situations, transmitting the original content to the content playback devices would unnecessarily increase the amount of data transmitted. As well, the content playback device would need to scale down the content for playback. Scaling down content for playback, particularly for playback on a screen size that is a non-integer fraction of the screen resolution of the original encoding, can result in a fuzzy or distorted video.

In particular embodiments, a transcoded encoding may be encoded in a screen resolution smaller than that of the original encoding. For instance, the source encoding may be encoded at a relatively high resolution, while the transcoded encoding may be presented in a significantly smaller resolution. If an encoding is scaled at a client machine, then the resulting video presentation is likely to appear fuzzy or included visual artifacts that disrupt the appearance of the content. By performing this scaling at a server configured to perform transcoding and with access to the source encoding, the content scaling may be performed in a much more accurate way, resulting in a video presentation that often appears noticeably sharper and clearer than would be the case if the content were scaled at a client machine. In particular embodiments, content may be scaled to a screen resolution of one or more requesting devices. Alternately, content may be scaled to an integer factor of such a screen resolution. According to various embodiments, improvements in video presentation quality and/or reductions in data size may also be achieved with other types of transcoding options, such as encoding format and frame rate.

According to various embodiments, adaptively creating video encodings to accommodate the characteristics of requesting devices may in some cases provide one or more advantages. For example, a larger number of devices may be supported by a media system. As another example, the set of available content encodings may automatically change to reflect changes in the types of devices requesting the content without requiring users to manually select settings for each encoding and/or each content item. As yet another example, the set of available content encodings may automatically change without requiring analysis of server logs to identify changes in the most common device screen sizes. As still another example, transcoding may be performed in a manner that efficiently uses computing resources, scaling the resource usage up and down depending on the amount of transcoding need.

According to various embodiments, video encodings may be adaptively created to provide content encodings for live video streams. For instance, a content provider may be transmitting video feed of a live event such as The Super Bowl. The content may be sent to the client devices in fragments or in a continuous stream. The media system may analyze requests for the content stream to determine what types of devices are requesting the content. Then, encoding of subsequent portions of the live stream may be dynamically updated to adjust to the types of requests received.

Figure 1:
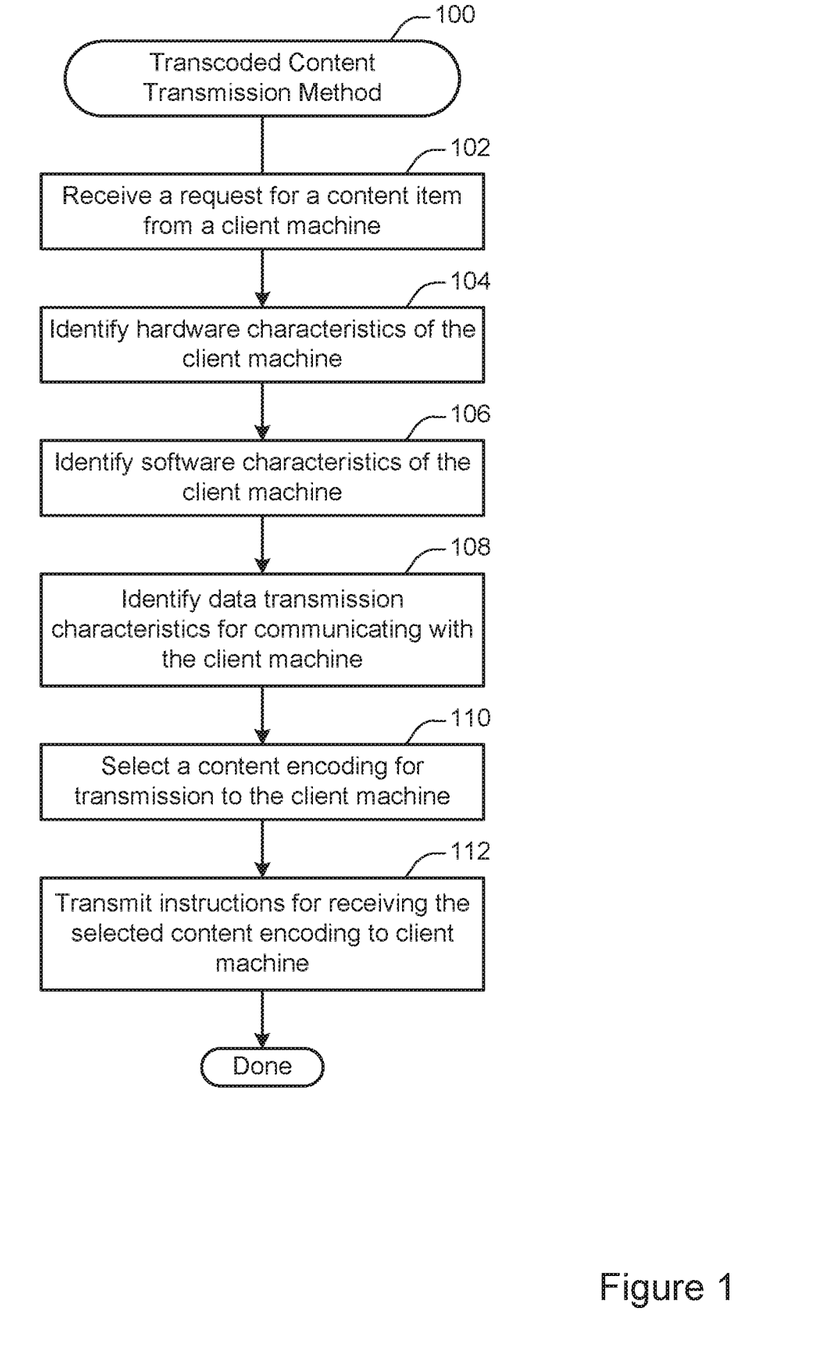
FIG. 1 illustrates an example of a method for transmitting transcoded content that can be used with various techniques and mechanisms of the present invention.

FIG. 1 shows a method 100 for transmitting transcoded content to a client machine. According to various embodiments, the method 100 may be performed at a media system, as discussed with respect to FIGS. 2-4. The media system may be operable to provide content management services to a number of different client machines, as discussed herein. The content management service may provide content to users such as a user of the client machine.

At 102, request for a content item is received from a client machine. According to various embodiments, the request may be received from any client machine capable of presenting a content item for playback. For instance, the client machine may be a television, laptop computer, desktop computer, tablet computer, mobile phone, or another type of mobile computing device.

According to various embodiments, the requested content may be any content capable of being transmitted to the client machine for playback. The requested content may include video and/or audio content. The content may be transmitted via a network such as the Internet, a cable or television cable network, or any other source. The content may be pre-recorded content, such as a movie or television program. Alternately, the content may be live content, such as a nightly news program or a sports broadcast.

According to various embodiments, the content may be requested by various techniques. For example, a content item may be selected in an electronic program guide or content navigation interface. As another example, a content item may be requested for downloading by clicking on a link in a web browser. As yet another example, a content item may be automatically requested, for instance in the case of an advertisement presented on the client machine.

At 104, one or more hardware characteristics of the client machine are identified. According to various embodiments, the hardware characteristics may include any features or capabilities of hardware present at or available to the client machine. The characteristics may include, but are not limited to, a processor or memory resource, a screen resolution, a screen size, or a communication capability associated with the client machine.

At 106, one or more software characteristics of the client machine are identified. According to various embodiments, the software characteristics may include any computer software programs or capabilities present at or available to the client machine. The characteristics may include, but are not limited to, content playback software, one or more content file types supported for playback, content management software, electronic program guide software, and/or content communications software for receiving content at the client machine.

At 108, one or more data transmission characteristics for communicating with the client machine are identified. According to various embodiments, the data transmission characteristics may be any properties, limitations, or procedures for transmitting information to or receiving information from the client machine. For example, the client machine may be a computing device that has limited bandwidth available for receipt of content. As another example, the client machine may be a mobile phone communicating via a network that places limits on communications bit rates. As yet another example, the client machine may be configured to receive content via a unicast content transmission method but not via a broadcast content transmission method.

According to various embodiments, the characteristics discussed with respect to operations 104-108 may be determined in various ways. For example, information may be transmitted from the client machine along with the request received at operation 102. As another example, the client machine may be linked with a content management account for managing and accessing content. When the client machine is so linked, some or all of the information may be stored in association with the content management account so that when subsequent requests are received from the client machine, the client machine's characteristics may be retrieved.

At 110, a content encoding is selected for transmission to the client machine. According to various embodiments, content may be encoded in various ways. For instance, different encodings of the same content item may differ in terms of frame rate, video bit rate, audio track bit rate, a number of audio channels, video encoding codec, audio encoding code, spacing between I-frames, or any other characteristics that may be selected when transcoding content for playback.

According to various embodiments, a limited number of encodings of a content item may be transcoded from a content source. The content encodings may be created via a transcoding process. After content encodings are created, the encodings may be stored for transmission to the client machines by media servers. An example of a system operable to handle requests for content, to transcode content for transmission to client machines, and to store the encoded content is discussed with respect to FIG. 2.

According to various embodiments, content encodings may be selected for creation based on the information identified in operations 104-108. For instance, if many requests are received from devices with a particular screen resolution, with similar bit rate requirements, and similar audio playback capabilities, then a content encoding may be created to match or approximate these characteristics. Techniques for transcoding content for storage so that the encoded content may be transmitted to client machines are discussed in additional detail with respect to FIG. 5.

At 112, instructions for receiving the selected content encoding are transmitted to the client machine. According to various embodiments, the selected content encoding may be transmitted to the client machine in response to the request for the content. In particular embodiments, the client machine may be sent instructions for retrieving the selected content encoding from a different location. For instance, content items may be available via a number of different media servers. When a content encoding is selected, the client machine may be sent a uniform resource locator for retrieving the selected content encoding from one of the media servers that has access to the stored the content encoding.

According to various embodiments, not all of the operations shown in FIG. 1 need be performed in every instance. For instance, in some cases certain types of information discussed in FIG. 1, such as software, hardware, or data transmission characteristics, may not be collected.

Figure 2:
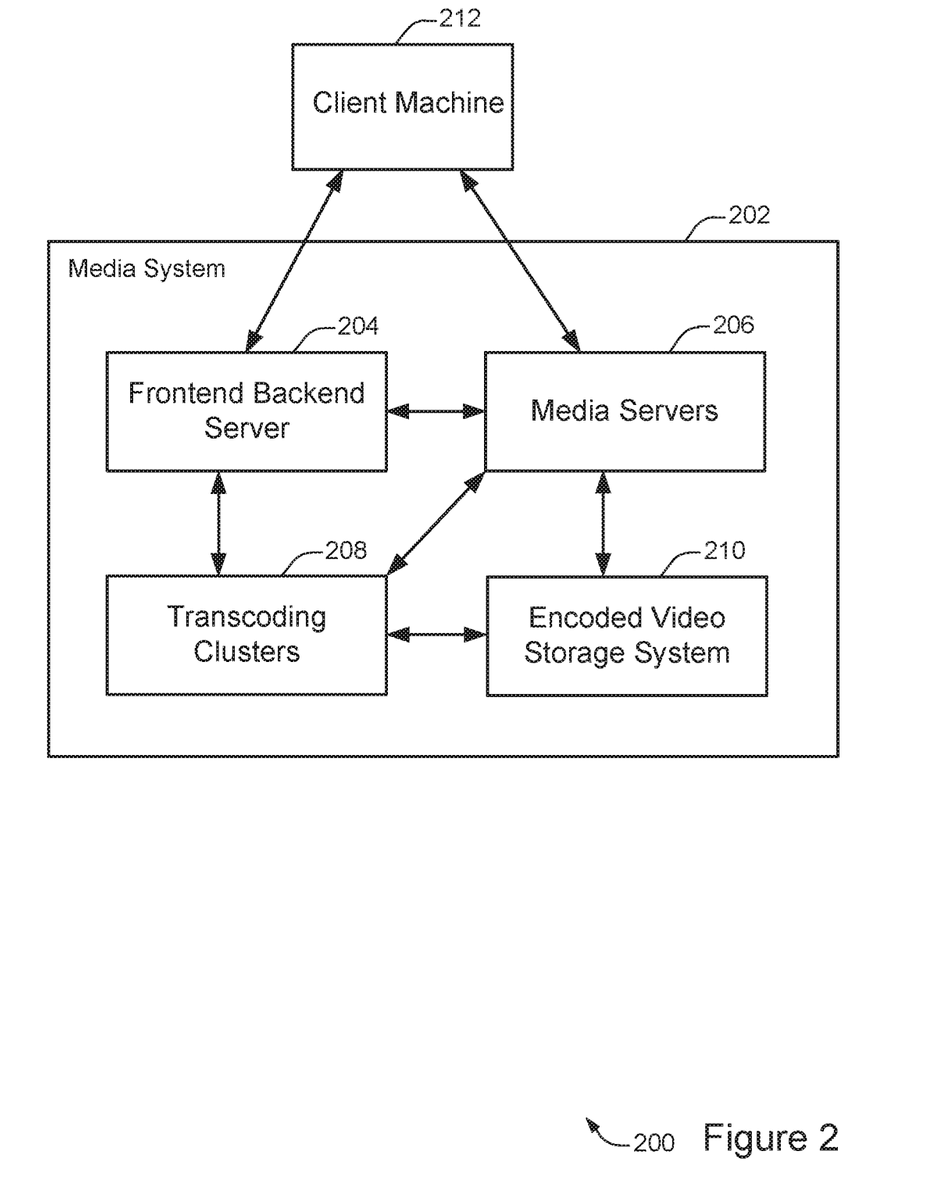
FIGS. 2-4 illustrate examples of systems that can be used with various techniques and mechanisms of the present invention.

FIG. 2 shows a system 200 that can be used with various techniques and mechanisms of the present invention. According to various embodiments, the system 200 may be used to transcode content and provide encoded content to any number of client machines. The system 200 includes the media system 202, which may communicate with the client machine 212. The media system 202 includes a frontend backend server 204, the media servers 206, the transcoding 208, and the encoded video storage system 210.

According to various embodiments, the media system 202 may receive requests for content, transcode content for presentation on client machines such as the client machine 212, and transmit the encoded content to the client machines. The client machine 212 may be any device capable of presenting content for playback. For instance, the client machine 212 may be a television, computer, or mobile computing device such as a mobile phone.

According to various embodiments, the client machine 212 may transmit a request to receive content to the frontend backend server 204. The frontend backend server may also identify information about the client machine such as the hardware, software, and/or communications capabilities of the client machine. For instance, the frontend backend server may identify a screen resolution of the client machine.

According to various embodiments, the information about the client machine may be identified via a number of different techniques. For example, the information may be transmitted from the client machine along with the request for content. As another example, the information may be associated with the client machine in a content management account.

According to various embodiments, the content management account may be used to facilitate the transmission of content from a number of different sources to a number of different devices associated with the content management account. For example, a user may view content from a cable or satellite television service provider, an on-demand video service provider such as Netflix or Amazon, and a local or network storage location via a connected user interface. As another example, the user may view content from these various sources on devices that may include, but are not limited to, a television, a desktop computer, a laptop computer, a tablet computer, and a mobile phone.

According to various embodiments, the frontend backend server 204 may select a content encoding for presentation on the client machine 212. For instance, a single content item may be transcoded into various types of encodings for presentation at content devices. The content item may be received from a content provider at a relatively high degree of quality with a corresponding high resolution and large data size. Before transmitting the content to client devices, the content may be transcoded into an appropriate format. For instance, the resolution may be decreased to a size suitable for mobile phones, laptops, televisions, or other devices that may have a relatively smaller screen size.

According to various embodiments, the frontend backend server 204 may select an available content encoding that closely matches the capabilities of the client machine. For instance, if the client machine has a screen resolution of 640×480 pixels, then the frontend backend server 204 may select a transcoding that has a resolution close to 640×480 pixels.

According to various embodiments, various encoding of a content item may be available at one or more of the media servers 206. When the frontend backend server 204 selects a encoding for presentation at the requesting client machine 212, the frontend backend server 204 may facilitate the receipt of the selected encoding by the client machine. For instance, the frontend backend server 204 may respond to the client machine's request with a uniform resource locator (URL) for retrieving the content at one of the media servers 206. Then, the client machine 212 may use the URL to retrieve the requested content.

According to various embodiments, the frontend backend server 204 may collect information regarding the characteristics of client machines requesting the content. For instance, the frontend backend server 204 may collect information such as the screen resolutions of the devices, the bandwidth capabilities of the devices, the software playback capabilities of the devices, or any other information.

Based on this information, the media system 202 may determine the encodings to create and store for transmission to client machines. In particular embodiments, the media system 202 may select encoding based on the number of requests received from client machines of particular types. For instance, if a large number of requests for a content item are received from devices having a screen resolution of 640×480 pixels, then the content item may be transcoded to an encoding having 640×480 pixels. When a particular set of encoding options are selected for transcoding, the transcoding instructions may be sent to the transcoding clusters 208.

According to various embodiments, transcoding may be performed by the transcoding clusters 208. The transcoding clusters may receive instructions for transcoding a content item and then transcode the content in accordance with the instructions. For instance, the instructions may specify an encoding resolution, an encoding file size, an encoding frame rate, or any other encoding options.

According to various embodiments, the transcoding clusters 208 may include any type of computing device or devices operable to transcode video and/or audio content. For instance, the transcoding clusters 208 may include distributing computers, mainframe computers, or any other type of computing environments. In some cases, each of the transcoding clusters may have any number of transcoding nodes.

According to various embodiments, portions of the transcoding clusters 208 may be provided by the content management provider associated with the media system 202. Alternately, or additionally, portions of the transcoding clusters 208 may be provided by a computing services provider that provides on-demand computing services via a network such as the Internet.

According to various embodiments, content items may be transcoding in various ways. For example, in some cases a single transcoding cluster and/or transcoding node may perform all of the transcoding for a content item. As another example, in some cases the transcoding of a content item may be divided among a variety of content items. For instance, a movie may be split into different segments, and different segments may be transcoded at different transcoding nodes. In particular embodiments, the techniques for transcoding content items may be strategically determined based on factors such as the amount of content to be transcoded, the type of content to be transcoded, the cost and/or efficiency of various types of computing resources, the speed at which video transcoding needs to be accomplished, or any other factors.

According to various embodiments, the computing resources active at the transcoding clusters 208 may be scaled up or down based on the demand for the resources. For instance, during some time intervals a large amount of transcoding may be requested. During these time intervals, more clusters and/or nodes may be activated for transcoding. However, during other time intervals, a relatively smaller amount of transcoding may be requested. During these other time intervals, clusters and/or nodes may be deactivated for transcoding.

According to various embodiments, by activating transcoding clusters on demand, the usage of computing resources may be made more efficient. For example, in the case of on-demand computing resources, payment is often calculated based on usage so that lower usage of the computing resources results in a lower cost. As another example, in the case of owned and managed computing resources, the cost of the maintaining the resources often depends on usage, so that machines that are less used are less likely to require attention. Accordingly, varying the usage of transcoding clusters and/or nodes based on demands may reduce the cost of providing encoded content for presentation on client machines.

According to various embodiments, content items that have been transcoded may be stored on the encoded video storage system 210. The encoded video storage system 210 may contain any number of hard drives or other storage media for storing the encoded content. The encoded content may be made available to the media servers 206 for transmission to the client machine 212 or other client machines. In particular embodiments, the encoded video storage system 210 may be incorporated into the media servers 206. For instance, different media servers may have different content encodings available for transmission to the client machines. Then, the frontend backend server 204 may provide the client machine 212 with an address to content at an appropriate one of the media servers 206 known to host the content encoding selected by the frontend backend server 204 that corresponds to the content item requested by the client machine 212.

According to various embodiments, a media system may include elements not shown in FIG. 2. For example, the media system may include a caching service that stores content provided by the media servers. Then, when content is requested, the content may be transmitted from the caching service if the content is cached, which may help reduce the computing load on the media servers.

Figure 3:
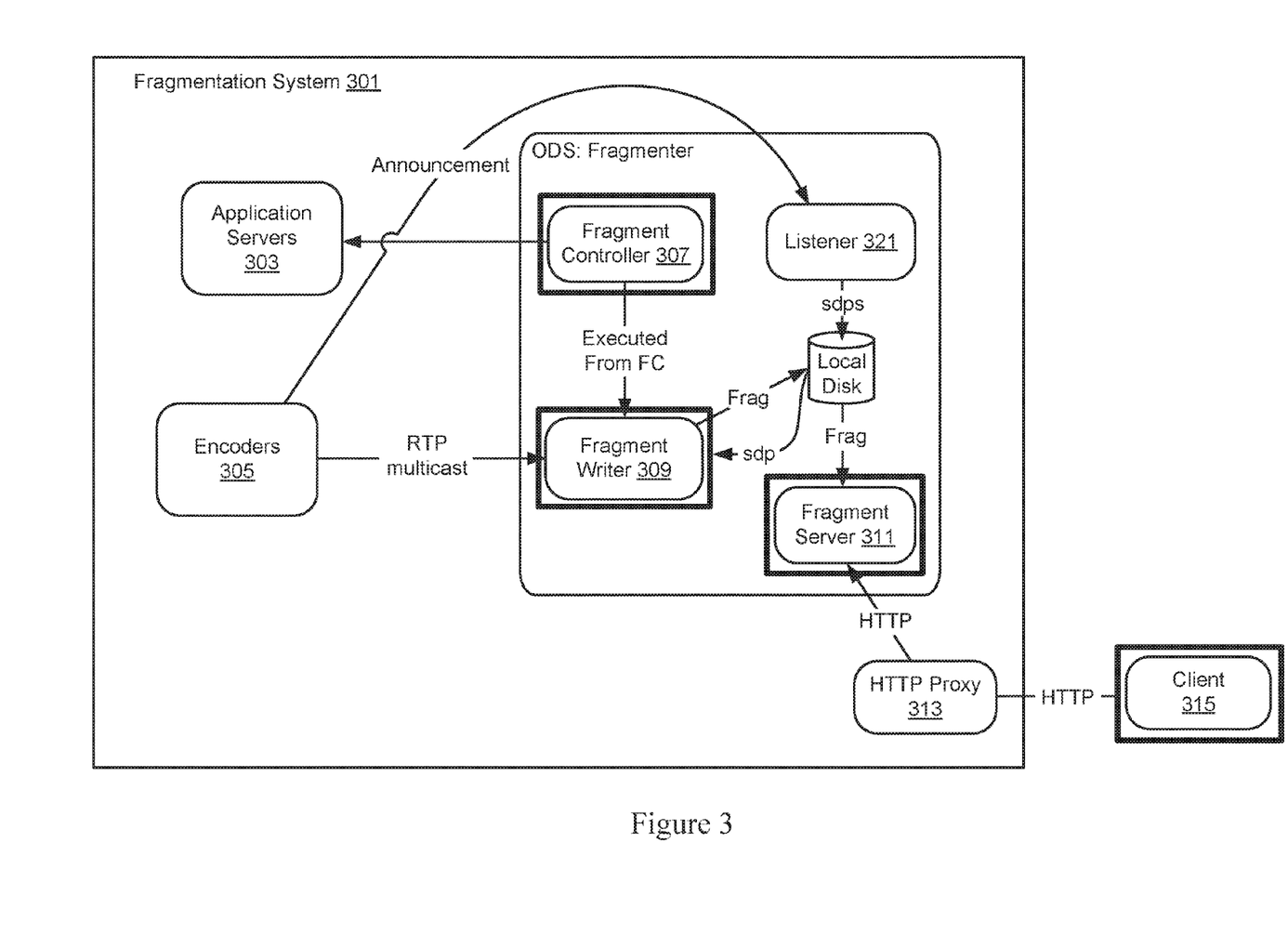

FIG. 3 is a diagrammatic representation illustrating one example of a fragment or segment system 301 associated with a content server that may be used in a broadcast and unicast distribution network. Encoders 305 receive media data from satellite, content libraries, and other content sources and sends RTP multicast data to fragment writer 309. The encoders 305 also send session announcement protocol (SAP) announcements to SAP listener 321. According to various embodiments, the fragment writer 309 creates fragments for live streaming, and writes files to disk for recording. The fragment writer 309 receives RTP multicast streams from the encoders 305 and parses the streams to repackage the audio/video data as part of fragmented MPEG-4 files. When a new program starts, the fragment writer 309 creates a new MPEG-4 file on fragment storage and appends fragments. In particular embodiments, the fragment writer 309 supports live and/or DVR configurations.

The fragment server 311 provides the caching layer with fragments for clients. The design philosophy behind the client/server application programming interface (API) minimizes round trips and reduces complexity as much as possible when it comes to delivery of the media data to the client 315. The fragment server 311 provides live streams and/or DVR configurations.

The fragment controller 307 is connected to application servers 303 and controls the fragmentation of live channel streams. The fragmentation controller 307 optionally integrates guide data to drive the recordings for a global/network DVR. In particular embodiments, the fragment controller 307 embeds logic around the recording to simplify the fragment writer 309 component. According to various embodiments, the fragment controller 307 will run on the same host as the fragment writer 309. In particular embodiments, the fragment controller 307 instantiates instances of the fragment writer 309 and manages high availability.

According to various embodiments, the client 315 uses a media component that requests fragmented MPEG-4 files, allows trick-play, and manages bandwidth adaptation. The client communicates with the application services associated with HTTP proxy 313 to get guides and present the user with the recorded content available.

Figure 4:
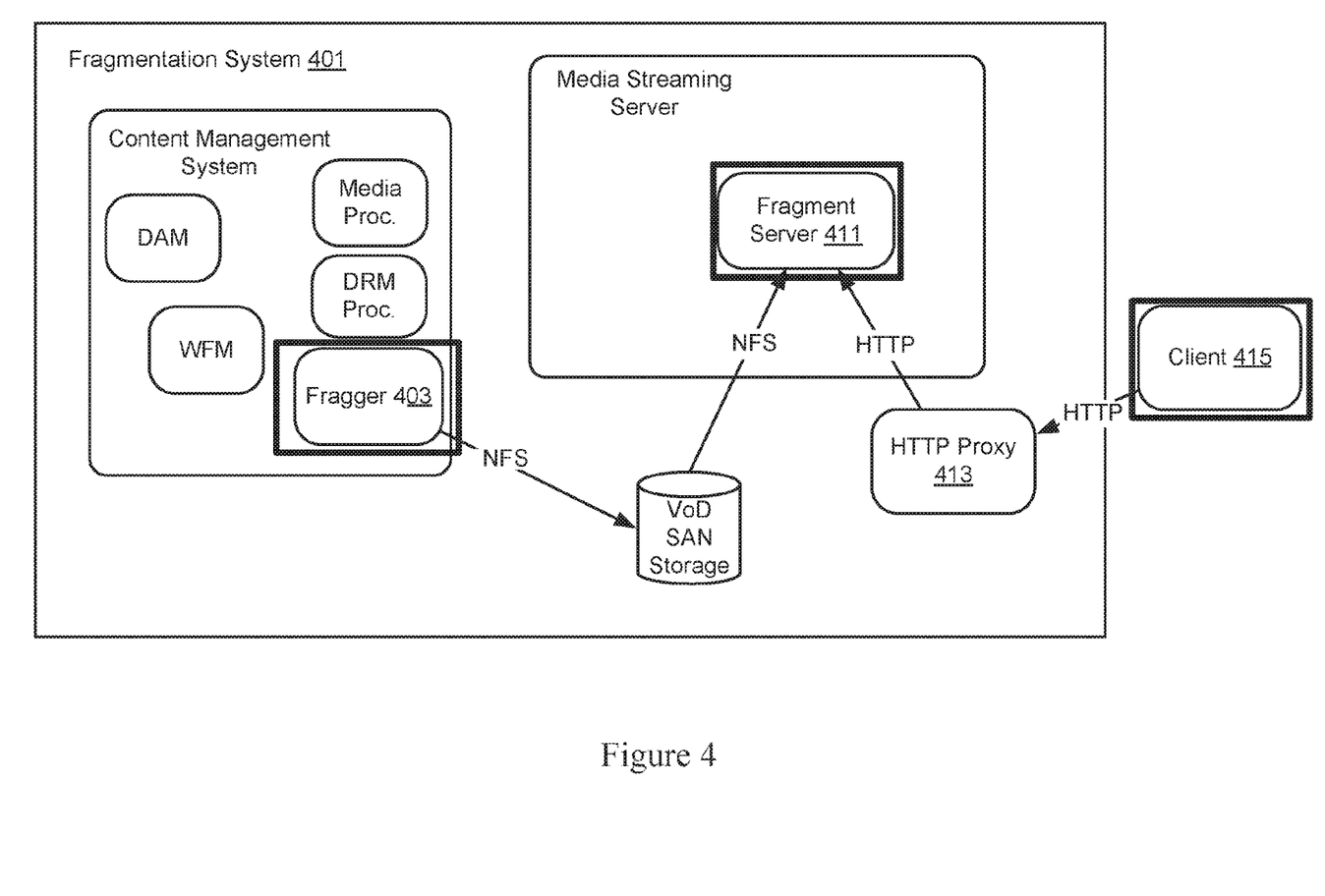

FIG. 4 illustrates one example of a fragmentation system 401 that can be used for video-on-demand (VoD) content. Fragger 403 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 411 provides the caching layer with fragments for clients. The design philosophy behind the client/server API minimizes round trips and reduces complexity as much as possible when it comes to delivery of the media data to the client 415. The fragment server 411 provides VoD content.

According to various embodiments, the client 415 uses a media component that requests fragmented MPEG-4 files, allows trick-play, and manages bandwidth adaptation. The client communicates with the application services associated with HTTP proxy 413 to get guides and present the user with the recorded content available.

Figure 5:
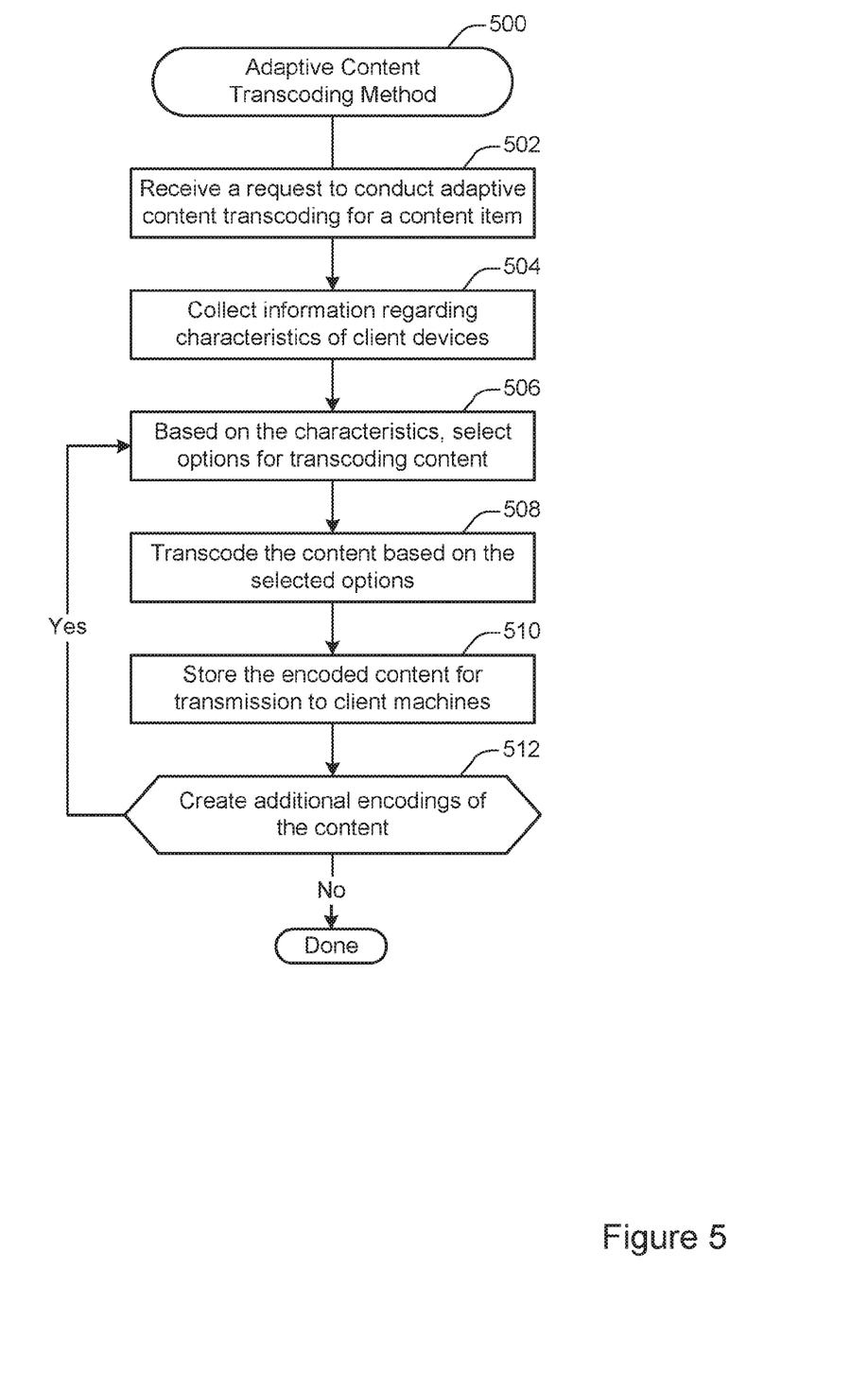
FIG. 5 illustrates an example of a method for adaptive content transcoding.

FIG. 5 illustrates an example of a method 500 for adaptive content transcoding. According to various embodiments, the method 500 may be performed at a media system, as discussed with respect to FIGS. 2-4. The method 500 may analyze information regarding client device capabilities and use the information to select options for transcoding the content. The types of content encodings stored for transmission to client machines may be customized so that encodings are created to match the characteristics of more popular devices.

At 502, a request to conduct adaptive content transcoding for a content item is received. According to various embodiments, the request to conduct adaptive content transcoding may be generated automatically or in response to user input. For example, a request to conduct adaptive content transcoding for a content item may be automatically generated when the content item is first added to the media system. As another example, a request to conduct transcoding may be generated at regular intervals. As yet another example, a request to conduct transcoding may be generated in response to the receipt of a large number of requests for the item, particularly if the request are from devices having characteristics that are not well supported by existing encodings.

As still another example, a request to conduct transcoding may be generated by a user such as a system administrator.

According to various embodiments, different types of encodings may be created for different content items. For instance, some content may be more often requested for playback on mobile, handheld devices that typically have relatively small screen sizes. However, other content may be more often requested for playback on devices that typically have relatively large screens, such as televisions or desktop computers.

At 504, information regarding characteristics of client devices is collected. According to various embodiments, the information collected may include, but is not limited to, the information discussed with respect to operations 104-108 shown in FIG. 1. In some cases, the information may be collected when client devices transmit requests for the content item. Alternately, or additionally, the information may be collected when devices are registered with the content management system.

In particular embodiments, the information may describe devices that have requested the content item being transcoded. Alternately, or additionally, the information may describe other devices and may be used to predict the preferred encodings for the content item. For example, the content item may be a particular episode of a television series. In this case, the content item may not yet have been requested for playback if it has not yet been released. However, information may be collected regarding client devices that have requested other episodes in the television series. As another example, the content item may be a movie, for instance a drama. In this case, information may be collected regarding similar movies to select an encoding or encodings for the content item.

At 506, options for transcoding content are selected based on the characteristics identified in operation 504. According to various embodiments, various types of options may be selected for transcoding content. These options may include, but are not limited to, a video bit rate, an audio track bit rate, a number of audio channels, an encoding format, a spacing between video I-frames, a video screen resolution size, data size, or any other transcoding options supported by the video transcoding system.

According to various embodiments, various techniques may be used to select options for transcoding content. For example, content may be encoded to match characteristics of requesting client devices when the number of requests from a type of client devices meets a designated threshold number or percentage, such as 10%. As another example, a designated number of encodings may be created for a content item, and the properties for each of these encodings may be selected to effectively serve as many of the requesting devices as possible.

According to various embodiments, the options for transcoding content and/or the conditions in which a new encoding is created may be designated via a configurable rule set. The rule set may be created or supplied by a user such as a system administrator. Alternately, the rule set may be dynamically created based on various criteria.

At 508, the content is transcoded based on the selected options. According to various embodiments, transcoding the content may involve retrieving a source encoding of the content. The source encoding may be received from a content provider and stored for later encoding. In particular embodiments, the source encoding may be a high fidelity encoding of relatively large file size.

According to various embodiments, the source encoding may be transcoded based on the options selected at operation

506. Transcoding the source encoding may involve applying one or more algorithms, transformations, or other data processing operations to transform the data encoded in the source encoding to a format in accordance with the options selected at operation 506. In particular embodiments, this process may be somewhat "lossy," resulting in an encoding that contains less information than the original encoding. However, in some cases the transcoding process may be lossless.

In particular embodiments, the transcoded encoding may be significantly smaller in data size than the source encoding. The smaller data size may make the encoding easier to transmit to a client machine for playback and easier for the client machine to store, process, and present.

In particular embodiments, the transcoded encoding may be presented in a screen resolution smaller than that of the original encoding. For instance, the source encoding may be encoded at a relatively high resolution, while the transcoded encoding may be presented in a significantly smaller resolution. If an encoding is scaled at a client machine, then the resulting video presentation is likely to appear fuzzy or included visual artifacts that disrupt the appearance of the content. By performing this scaling at a server configured to perform transcoding and with access to the source encoding, the content scaling may be performed in a much more accurate way, resulting in a video presentation that often appears noticeably sharper and clearer than would be the case if the content were scaled at a client machine.

According to various embodiments, various types of computing frameworks may be used to transcode content. These frameworks may include, but are not limited to: grid array computers, distributed computers, computers managed by the media system, and on-demand computers accessible via a network such as the Internet. In particular embodiments, transcoding may be performed at one or more transcoding clusters, which each may have computing resources divided among a number of transcoding nodes.

According to various embodiments, computer resources may be activated and deactivated for transcoding to efficiently accommodate the demand for the resources. In some cases, a content item may be encoded all at once. In other cases, a content item may be broken into segments and encoded separately, which may use more computing resources but use them for a smaller length of time.

At 510, the encoded content is stored for transmission to client machines. In particular embodiments, the encoded content may be stored at the encoded video storage system 210 discussed with respect to FIG. 2. When the encoded content is stored, the media servers 206 may be informed that the content is available. Then, the media servers 206 may transmit the encoded video to a client machine that requests it.

According to various embodiments, encodings may be stored for a length of time for transmitting to client devices. The length of time for storing each encoding may be strategically determined based on factors that may include, but are not limited to, the availability of storage space, the frequency or number of requests for the content item, the frequency or number of requests for the encoding, the frequency or number of requests for other encodings, and the number of other encodings of the content item.

At 512, a determination is made as to whether to create additional encodings of the content. According to various embodiments, the determination is made as to whether to create encodings may be made based on various factors. For example, content items that are requested more often may be allotted a higher number of encodings. As another example, content items that are requested from a larger variety of devices, such as devices that vary in screen size, may be allotted a higher number of encodings. As yet another example, content encodings may be created for device characteristics that exceed a designated threshold number of requests for the content item. As still another example, the determination may be based at least in part on an availability of computing resources, storage space, encoding size, or any other factors.

Figure 6:
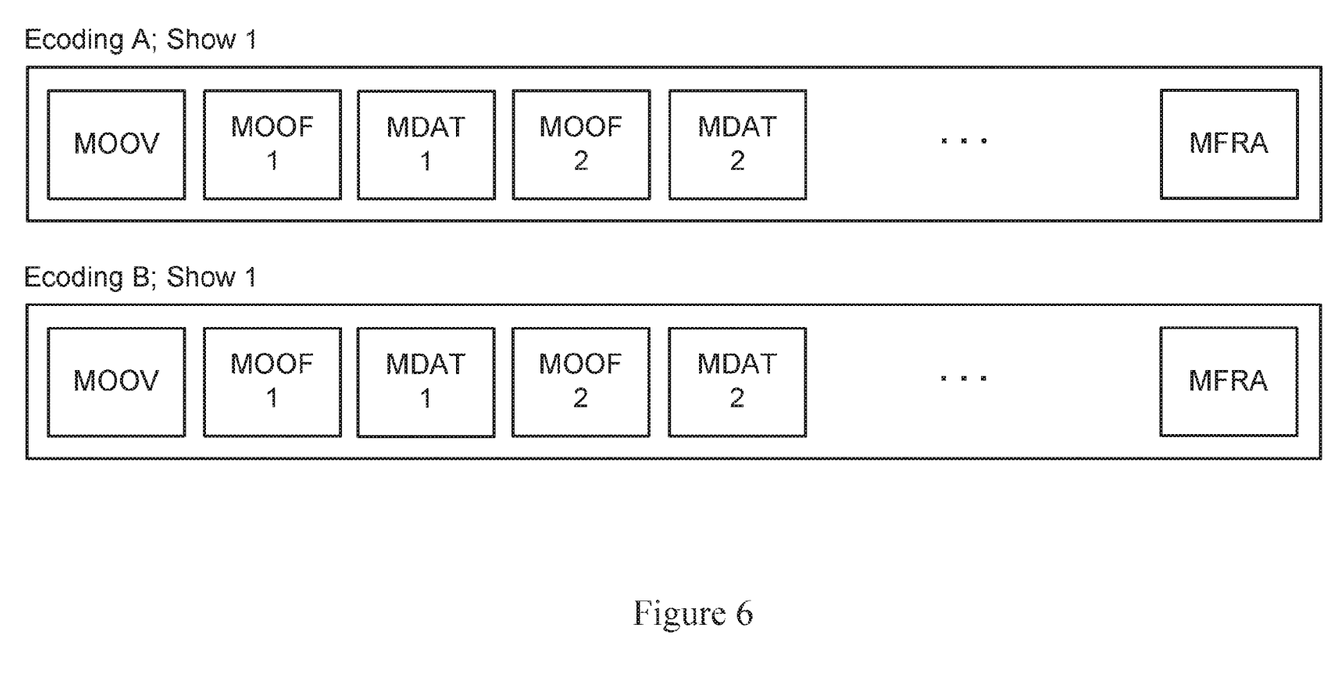
FIG. 6 illustrates examples of encoding streams.

FIG. 6 illustrates examples of files stored by the fragment writer. According to various embodiments, the fragment writer is a component in the overall fragmenter. It is a binary that uses command line arguments to record a particular program based on either NTP time from the encoded stream or wallclock time. In particular embodiments, this is configurable as part of the arguments and depends on the input stream. When the fragment writer completes recording a program, it exits. For live streams, programs are artificially created to be short time intervals e.g. 5-15 minutes in length.

According to various embodiments, the fragment writer command line arguments are the SDP file of the channel to record, the start time, end time, name of the current and next output files. The fragment writer listens to RTP traffic from the live video encoders and rewrites the media data to disk as fragmented MPEG-4. According to various embodiments, media data is written as fragmented MPEG-4 as defined in MPEG-4 part 12 (ISO/IEC 14496-12). Each broadcast show is written to disk as a separate file indicated by the show ID (derived from EPG). Clients include the show ID as part of the channel name when requesting to view a prerecorded show. The fragment writer consumes each of the different encodings and stores them as a different MPEG-4 fragment.

In particular embodiments, the fragment writer writes the RTP data for a particular encoding and the show ID field to a single file. Inside that file, there is metadata information that describes the entire file (MOOV blocks). Atoms are stored as groups of MOOF/MDAT pairs to allow a show to be saved as a single file. At the end of the file there is random access information that can be used to enable a client to perform bandwidth adaptation and trick play functionality.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

The fragment server responds to HTTP requests for content. According to various embodiments, it provides APIs that can be used by clients to get necessary headers required to decode the video and seek any desired time frame within the fragment and APIs to watch channels live. Effectively, live channels are served from the most recently written fragments for the show on that channel. The fragment server returns the media header (necessary for initializing decoders), particular fragments, and the random access block to clients. According to various embodiments, the APIs supported allow for optimization where the metadata header information is returned to the client along with the first fragment. The fragment writer creates a series of fragments within the file. When a client requests a stream, it makes requests for each of these fragments and the fragment server reads the portion of the file pertaining to that fragment and returns it to the client.

According to various embodiments, the fragment server uses a REST API that is cache-friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

In particular embodiments, client requests for fragments follow the following format: http://{HOSTNAME}/frag/{CHANNEL}/{BITRATE}/[{ID})/]{COMMAND}[/{ARG}] e.g. http://frag.hosttv.com/frag/1/H8QVGAH264/1270059632.mp4/fragment/42. According to various embodiments, the channel name will be the same as the backend-channel name that is used as the channel portion of the SDP file. VoD uses a channel name of "vod". The BITRATE should follow the BITRATE/RESOLUTION identifier scheme used for RTP streams. The ID is dynamically assigned. For live streams, this may be the UNIX timestamp; for DVR this will be a unique ID for the show; for VoD this will be the asset ID. The ID is optional and not included in LIVE command requests. The command and argument are used to indicate the exact command desired and any arguments. For example, to request chunk 42, this portion would be "fragment/42".

The URL format makes the requests content delivery network (CDN) friendly because the fragments will never change after this point so two separate clients watching the same stream can be serviced using a cache. In particular, the head end architecture leverages this to avoid too many dynamic requests arriving at the Fragment Server by using an HTTP proxy at the head end to cache requests.

According to various embodiments, the fragment controller is a daemon that runs on the fragmenter and manages the fragment writer processes. A configured filter that is executed by the fragment controller can be used to generate the list of broadcasts to be recorded. This filter integrates with external components such as a guide server to determine which shows to record and which broadcast ID to use.

According to various embodiments, the client includes an application logic component and a media rendering component. The application logic component presents the user interface (UI) for the user, communicates to the front-end server to get shows that are available for the user, and authenticates the content. As part of this process, the server returns URLs to media assets that are passed to the media rendering component.

In particular embodiments, the client relies on the fact that each fragment in a fragmented MP4 file has a sequence number. Using this knowledge and a well-defined URL structure for communicating with the server, the client requests fragments individually as if it was reading separate files from the server simply by requesting URLs for files associated with increasing sequence numbers. In some embodiments, the client can request files corresponding to higher or lower bit rate streams depending on device and network resources.

Since each file contains the information needed to create the URL for the next file, no special playlist files are needed, and all actions (startup, channel change, seeking) can be performed with a single HTTP request. After each fragment is downloaded, the client assesses, among other things, the size of the fragment and the time needed to download it in order to determine if downshifting is needed or if there is enough bandwidth available to request a higher bit rate.

Because each request to the server looks like a request to a separate file, the response to requests can be cached in any HTTP Proxy, or be distributed over any HTTP based content delivery network CDN.

Figure 7:
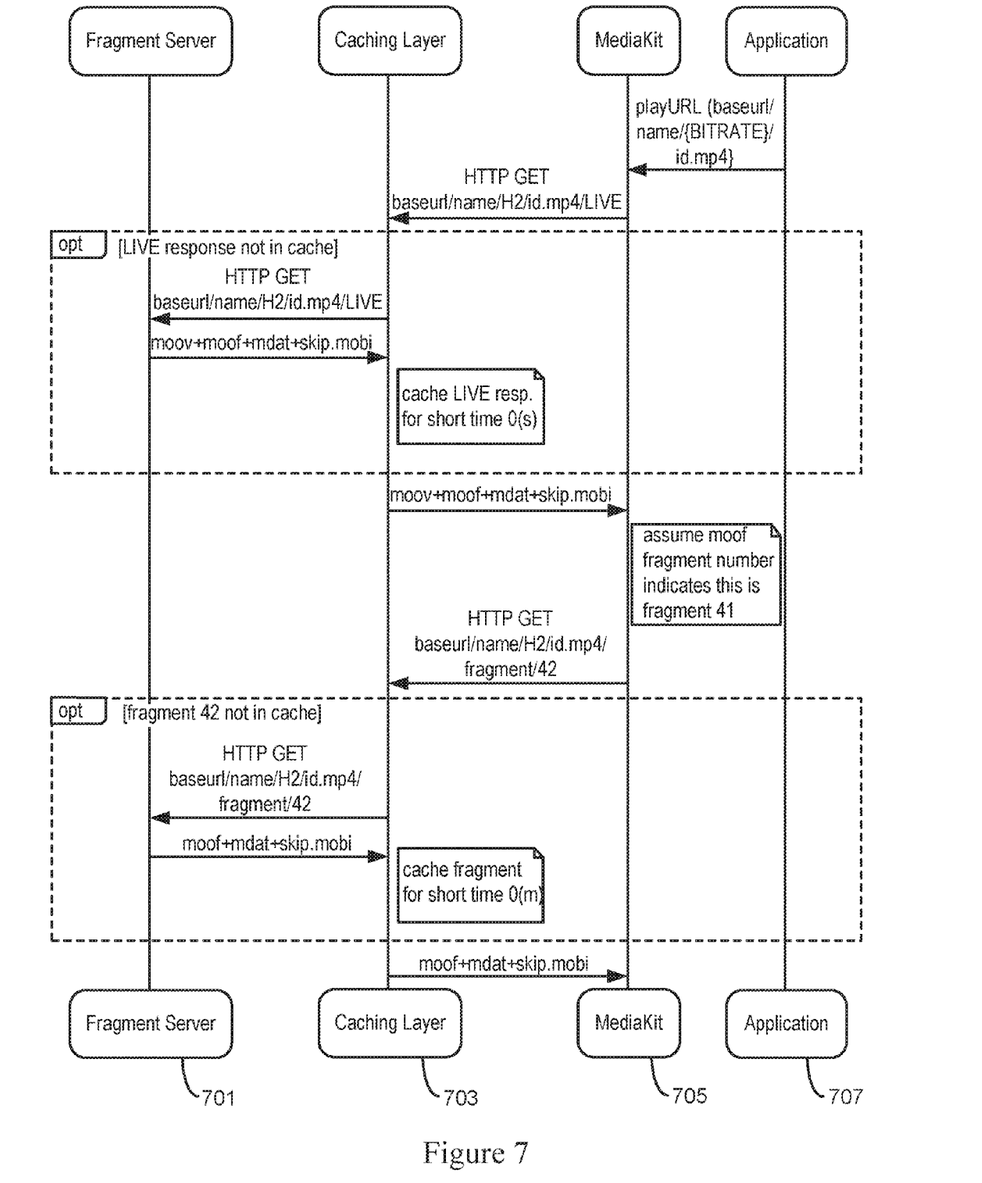
FIG. 7 illustrates one example of an exchange used with a media delivery system.

FIG. 7 illustrates an interaction for a client receiving a media stream such as a live stream. The client starts playback when fragment 71 plays out from the server. The client uses the fragment number so that it can request the appropriate subsequent file fragment. An application such as a player application 707 sends a request to mediakit 705. The request may include a base address and bit rate. The mediakit 705 sends an HTTP get request to caching layer 703. According to various embodiments, the live response is not in cache, and the caching layer 703 forwards the HTTP get request to a fragment server 701. The fragment server 701 performs processing and sends the appropriate fragment to the caching layer 703 which forwards to the data to mediakit 705.

The fragment may be cached for a short period of time at caching layer 703. The mediakit 705 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 705 may request a next fragment having a different data rate. In some instances, the mediakit 705 may request a next fragment having a higher data rate. According to various embodiments, the fragment server 701 maintains fragments for different quality of service streams with timing synchronization information to allow for timing accurate playback.

The mediakit 705 requests a next fragment using information from the received fragment. According to various embodiments, the next fragment for the media stream may be maintained on a different server, may have a different bit rate, or may require different authorization. Caching layer 703 determines that the next fragment is not in cache and forwards the request to fragment server 701. The fragment server 701 sends the fragment to caching layer 703 and the fragment is cached for a short period of time. The fragment is then sent to mediakit 705.

Figure 8:
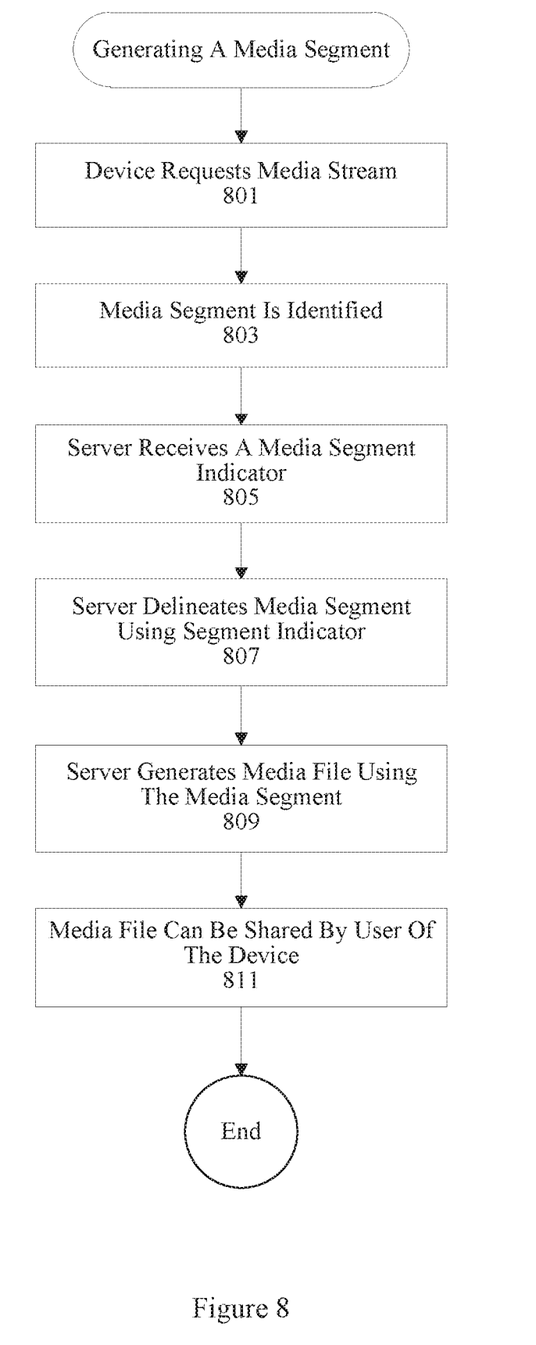
FIG. 8 illustrates one technique for generating a media segment.

FIG. 8 illustrates a particular example of a technique for generating a media segment. According to various embodiments, a media stream is requested by a device at 801. The media stream may be a live stream, media clip, media file, etc. The request for the media stream may be an HTTP GET request with a baseurl, bit rate, and file name. At 803, the media segment is identified. According to various embodiments, the media segment may be a 35 second sequence from an hour long live media stream. The media segment may be identified using time indicators such as a start time and end time indicator. Alternatively, certain sequences may include tags such as fight scene, car chase, love scene, monologue, etc., that the user may select in order to identify a media segment. In still other examples, the media stream may include markers that the user can select. At 805, a server receives a media segment indicator such as one or more time indicators, tags, or markers. In particular embodiments, the server is a snapshot server, content server, and/or fragment server. According to various embodiments, the server delineates the media segment maintained in cache using the segment indicator at 807. The media stream may only be available in a channel buffer. At 809, the server generates a media file using the media segment maintained in cache. The media file can then be shared by a user of the device at 811. In some examples, the media file itself is shared while in other examples, a link to the media file is shared.

Figure 9:
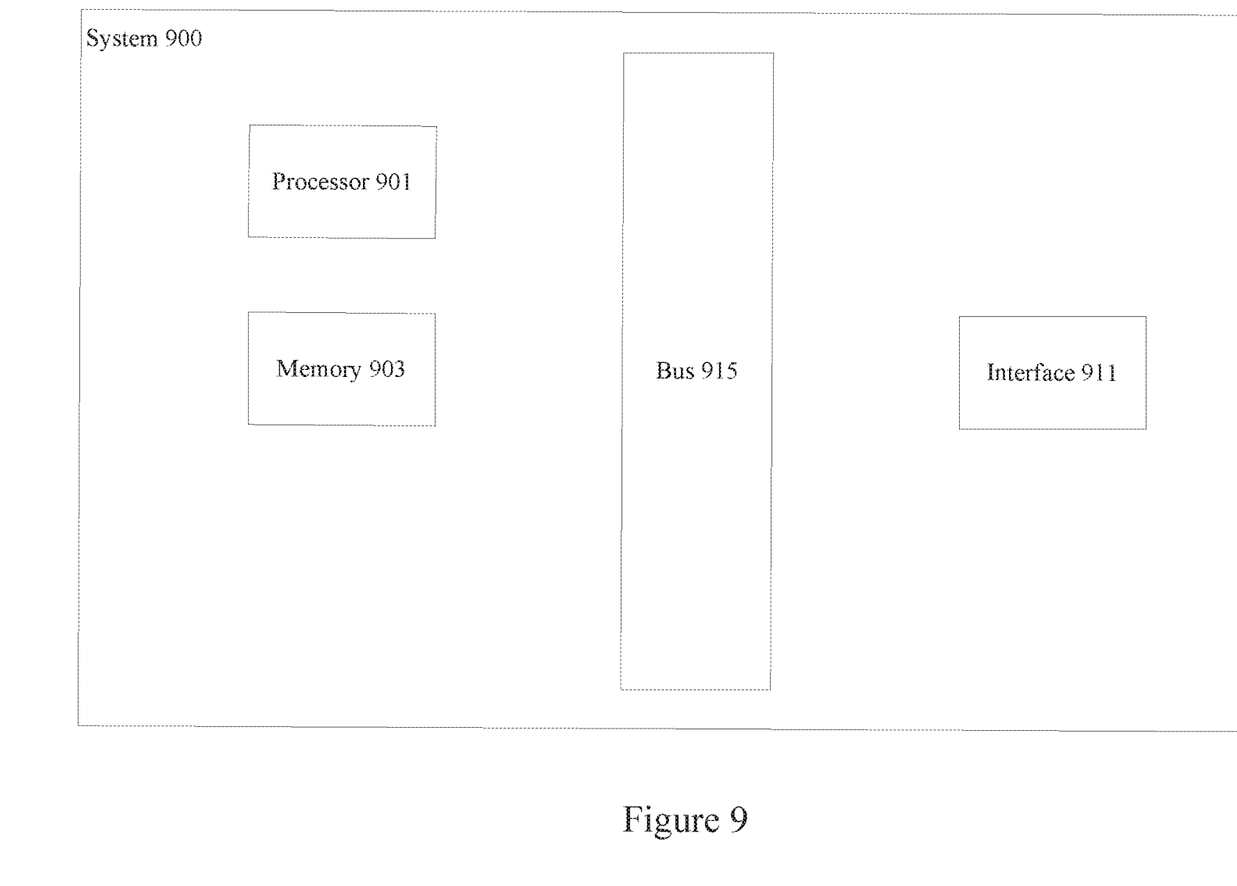
FIG. 9 illustrates one example of a system.

FIG. 9 illustrates one example of a server. According to particular embodiments, a system 900 suitable for implementing particular embodiments of the present invention includes a processor 901, a memory 903, an interface 911, and a bus 915 (e.g., a PCI bus or other interconnection fabric) and operates as a streaming server. When acting under the control of appropriate software or firmware, the processor 901 is responsible for modifying and transmitting live media data to a client. Various specially configured devices can also be used in place of a processor 901 or in addition to processor 901. The interface 911 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 900 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
receiving, at a server, a plurality of requests from client devices to access a live streaming media content item for playback at the client devices, each of the client devices having associated therewith device characteristic information that describes one or more characteristics of the client device;
identifying a device characteristic that describes a portion of the client devices, the portion of the client devices meeting a threshold value for creating a media content encoding item, wherein the identified device characteristic comprises a screen resolution of a display screen at the portion of the client devices; and
transcoding a media content source item corresponding to the requested live streaming media content item to create a media content encoding item, the media content encoding item being encoded to match the identified device characteristic.

2. The method recited in claim 1, wherein the identified device characteristic is a characteristic selected from the group consisting of: a network connection speed for communicating with the portion of the client devices, a device processor common to the portion of the client devices, and a number of colors supported by display screens at the portion of the client devices.

3. The method recited in claim 1, the method further comprising:
storing the media content encoding item on a storage system for transmission to selected ones of the client devices.

4. The method recited in claim 1, wherein the server is operable to provide content management services to the client devices, the content management services including the providing of on-demand video content to the client devices.

5. The method recited in claim 1, the method further comprising:
selecting, for each of the client devices, a respective one of a plurality of media content encoding items for presenting the requested live streaming media content item on the client devices; and
transmitting to each of the client devices an instruction for receiving the respective media content encoding item.

6. The method recited in claim 1, wherein the threshold value comprises a designated number of requests.

7. The method recited in claim 1, wherein the identified device characteristic is a characteristic selected from the group consisting of: a number of audio channels, an audio track bit rate, a video bit rate, a video frame rate, an encoding format, and a spacing between video I-frames.

8. A system comprising:
a communications interface operable to receive a plurality of requests from client devices to access a live streaming media content item for playback at the client devices, each of the client devices having associated therewith device characteristic information that describes one or more characteristics of the client device;
a processor operable to identify a device characteristic that describes a portion of the client devices, the portion of the client devices meeting a threshold value for creating a media content encoding item, wherein the identified device characteristic comprises a screen resolution of a display screen at the portion of the client devices; and
a transcoding module operable to transcode a media content source item corresponding to the requested live streaming media content item to create a media content encoding item, the media content encoding item being encoded to match the identified device characteristic.

9. The system recited in claim 8, wherein the identified device characteristic is a characteristic selected from the group consisting of: a network connection speed for communicating with the portion of the client devices, a device processor common to the portion of the client devices, and a number of colors supported by display screens at the portion of the client devices.

10. The system recited in claim 8, the system further comprising:
a storage system operable to store the media content encoding item for transmission to selected ones of the client devices.

11. The system recited in claim 8, wherein the server is operable to provide content management services to the client devices, the content management services including the providing of on-demand video content to the client devices.

12. The system recited in claim 8,
wherein the processor is further operable to select, for each of the client devices, a respective one of a plurality of media content encoding items for presenting the requested live streaming media content item on the client devices, and
wherein the communications interface is further operable to transmit to each of the client devices an instruction for receiving the respective media content encoding item.

13. The system recited in claim 8, wherein the threshold value comprises a designated number of requests.

14. The system recited in claim 8, wherein the identified device characteristic is a characteristic selected from the group consisting of: a number of audio channels, an audio track bit rate, a video bit rate, a video frame rate, an encoding format, and a spacing between video I-frames.

15. One or more non-transitory computer readable media having instructions stored thereon for performing a method, the method comprising:
receiving, at a server, a plurality of requests from client devices to access a live streaming media content item for playback at the client devices, each of the client devices having associated therewith device characteristic information that describes one or more characteristics of the client device;
identifying a device characteristic that describes a portion of the client devices, the portion of the client devices meeting a threshold value for creating a media content encoding item, wherein the identified device characteristic comprises a screen resolution of a display screen at the portion of the client devices; and
transcoding a media content source item corresponding to the requested live streaming media content item to create a media content encoding item, the media content encoding item being encoded to match the identified device characteristic.

16. The one or more non-transitory computer readable media recited in claim 15, wherein the identified device characteristic is a characteristic selected from the group consisting of: a network connection speed for communicating with the portion of the client devices, a device processor common to the portion of the client devices, and a number of colors supported by display screens at the portion of the client devices.

17. The one or more non-transitory computer readable media recited in claim 15, the method further comprising:
storing the media content encoding item on a storage system for transmission to selected ones of the client devices.

* * * * *